July 2, 1935.  W. S. BURGESS ET AL  2,006,437
APPARATUS FOR DIFFUSING PYRETHRUM
Filed Sept. 28, 1932
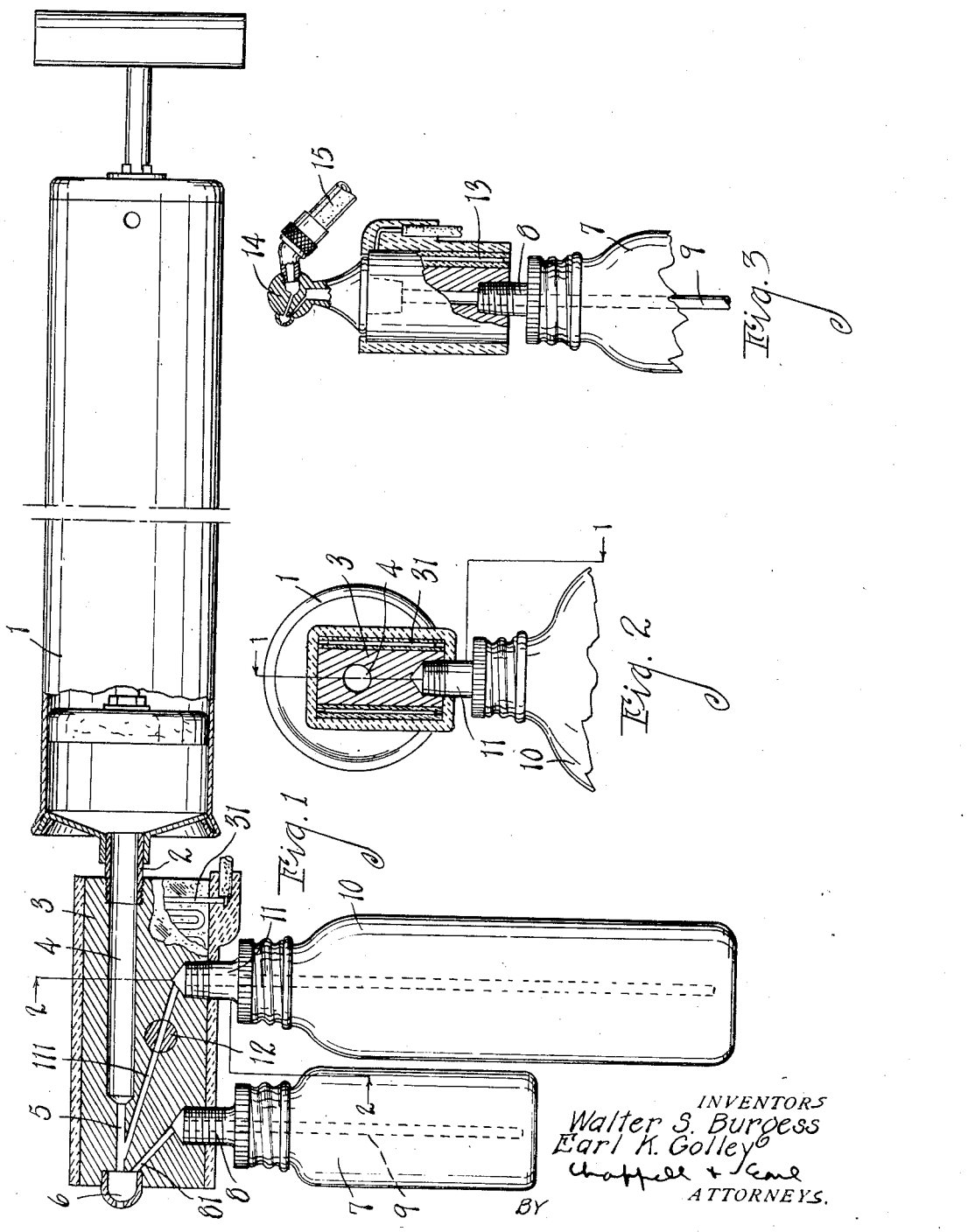
INVENTORS
Walter S. Burgess
Earl K. Golley
BY Chappell + Earl
ATTORNEYS.

Patented July 2, 1935

2,006,437

UNITED STATES PATENT OFFICE 2,006,437

APPARATUS FOR DIFFUSING PYRETHRUM

Walter S. Burgess and Earl Knight Golley, Benton Harbor, Mich., assignors to The O. & W. Thum Company, Grand Rapids, Mich.

Application September 28, 1932, Serial No. 635,177

3 Claims. (Cl. 299—88)

This invention relates to an improved apparatus for diffusing and distributing pyrethrum. The invention is a modification and development of our apparatus described in our application filed September 17, 1931, Serial No. 563,312.

The objects of the invention are:

First, to provide such an apparatus in which the propelling and spraying means is compressed air.

Second, to provide such an apparatus in which an ordinary piston spray pump can be utilized.

Third, to provide such an apparatus in which the amount of water in its relation to the amount of pyrethrum concentrate or solution can be regulated.

Further objects and advantages pertaining to details of construction and operation will appear from the description to follow.

Preferred embodiments of our invention are illustrated in the accompanying drawing, in which:

Fig. 1 is a detail elevation view of our apparatus substantially full-size, portions being shown in longitudinal section to show details.

Fig. 2 is an enlarged detail transverse sectional view on line 2—2 of Fig. 1.

Fig. 3 is a detail view of a modified form in which compressed air may be supplied by a tube or hose from any suitable source.

The parts will be identified by their numerals of reference, which are the same in all the views.

1 is a piston pump of the usual construction for insect spray guns. 2 is the discharge spout therefrom. 3 is a heater element containing a passage 4 into which the air is forced and delivered and heated. 5 is the reduced discharge nozzle therefrom. 6 is an enlarged mixing chamber at the end of the said discharge nozzle. The heater element 3 is preferably heated by an electric coil 31 which may be connected in any suitable manner to a source of supply, as a lamp socket.

7 is a bottle or reservoir for pyrethrum concentrate or solution. This bottle is provided with a nozzle 8 which connects into the heater element 3 and is provided with a reduced passage 81 leading to the mixing chamber 6. 9 is a suction tube within the reservoir 7 for drawing up the supply of pyrethrum solution.

10 is a reservoir or bottle for containing water. 11 is the nozzle therefor connecting into the heater element and provided with a reduced passage 111. This is regulated by a valve 12 shown in cross section in Fig. 1. The reduced passage 111 preferably delivers at an angle into the reduced air passage 5, delivering the hot air and steam into the mixing chamber.

The water should preferably be changed to steam in passage 5 and when it is delivered into the mixing chamber 6.

In Fig. 3 we show the heater element 13 with a direct connection to the reservoir 7 with a De Vilbiss spray nozzle 14 supplied from a pressure hose 15. This gives substantially the results, particularly if the concentrate or solution is emulsified with water. This apparatus can, of course be greatly modified.

Having thus described our invention, what we claim as new and desire to secure by Letters Patent is:

1. An apparatus comprising a source of compressed air having a spout, a heater member having a nozzle including a mixing chamber, an outlet from said mixing chamber, and an air passage connecting said spout to said mixing chamber, a supply reservoir for pyrethrum solution having a delivery tube passing through said heater member to said mixing chamber, a second supply reservoir for water having a water delivery tube through said heater to said air passage, and a heater element for said heater of a capacity sufficient to convert water passing through said water delivery tube to steam when said water is being drawn through said tube by the injector action of the nozzle.

2. An apparatus comprising a source of compressed air, an aspirating nozzle having a passage leading to said source of air and a delivery tube, a second delivery tube for water entering said nozzle at a point between the first delivery tube and the source of air, a pyrethrum solution supply reservoir for said first tube, a second supply reservoir for water for said water delivery tube, a heating element for heating said second tube, said heating element being of a capacity to convert water pulled through said second tube by the operation of the aspirating nozzle to steam.

3. An apparatus comprising a source of compressed air, a nozzle having a passage leading to said source of air, said nozzle having a delivery tube for pyrethrum solution, and a second delivery tube for water, a supply reservoir for pyrethrum solution, and a second supply reservoir for water each connected to one of said delivery tubes, and a heating element for heating the water delivery tube, said heater being of a capacity to convert to steam the water passing through said water delivery tube when the nozzle is operated.

WALTER S. BURGESS.
EARL KNIGHT GOLLEY.